United States Patent
Takahashi (10) Patent No.: US 11,325,565 B2
(45) Date of Patent: May 10, 2022

(54) VEHICLE RECOGNITION DEVICE AND VEHICLE CONTROL APPARATUS

(71) Applicant: SUBARU CORPORATION, Tokyo (JP)

(72) Inventor: Naoki Takahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 281 days.

(21) Appl. No.: 16/655,844

(22) Filed: Oct. 17, 2019

(65) Prior Publication Data

US 2020/0130649 A1  Apr. 30, 2020

(30) Foreign Application Priority Data

Oct. 30, 2018  (JP) .............................. JP2018-203433

(51) Int. Cl.
| | | |
|---|---|---|
| *B60S 1/08* | (2006.01) | |
| *B60R 11/04* | (2006.01) | |
| *B60W 40/04* | (2006.01) | |
| *G06K 9/00* | (2022.01) | |

(52) U.S. Cl.
CPC ............. *B60S 1/0896* (2013.01); *B60R 11/04* (2013.01); *B60W 40/04* (2013.01); *G06K 9/00825* (2013.01); *B60R 2300/8053* (2013.01); *B60W 2554/80* (2020.02); *B60W 2555/20* (2020.02)

(58) Field of Classification Search
CPC .... B60S 1/0896; B60S 1/0477; B60S 1/0818; B60S 1/0822; B60S 1/087; B60R 11/04; B60R 2300/8053; B60W 40/04; B60W 2554/80; B60W 2555/20; G06K 9/00825

See application file for complete search history.

(56) References Cited

U.S. PATENT DOCUMENTS

| | | | | |
|---|---|---|---|---|
| 2015/0172582 | A1* | 6/2015 | Kiyohara | ............. H04N 5/2171 348/322 |
| 2015/0228194 | A1* | 8/2015 | Nomura | .................... G08G 1/16 348/118 |
| 2017/0064175 | A1* | 3/2017 | Furutake | ................... G02B 3/02 |
| 2018/0099645 | A1* | 4/2018 | Oikawa | ................ B60S 1/0818 |
| 2020/0079324 | A1* | 3/2020 | Hase | ........................ B60S 1/245 |
| 2020/0262360 | A1* | 8/2020 | Takano | ................. B60S 1/0844 |

FOREIGN PATENT DOCUMENTS

JP   2017-210019 A   11/2017

* cited by examiner

*Primary Examiner* — Kenneth J Malkowski
(74) *Attorney, Agent, or Firm* — Troutman Pepper Hamilton Sanders LLP (57) ABSTRACT

A vehicle recognition device includes a vehicle recognizer and a wiper controller. The vehicle recognizer is configured to determine, upon a first state, whether a transition is made from the first state to a second state. The first state is a state in which a second vehicle is recognizable from captured images obtained from respective cameras provided in a first vehicle. The second state is a state in which the second vehicle is unrecognizable from one or more of the captured images. The one or more of the captured images is obtained from all or a part of the cameras. The wiper controller is configured to automatically control an operation of a wiper of the first vehicle on the basis of an automatic control, when the vehicle recognizer determines that the transition is made from the first state to the second state.

17 Claims, 4 Drawing Sheets

VEHICLE RECOGNITION DEVICE AND VEHICLE CONTROL APPARATUS

CROSS-REFERENCE TO RELATED APPLICATIONS

The present application claims priority from Japanese Patent Application No. 2018-203433 filed on Oct. 30, 2018, the entire contents of which are hereby incorporated by reference.

BACKGROUND

The technology relates to a vehicle recognition device that recognizes another vehicle, i.e., a vehicle other than an own vehicle, and to a vehicle control apparatus that includes the vehicle recognition device.

SUMMARY

An aspect of the technology provides a vehicle recognition device that includes: a vehicle recognizer configured to recognize, from captured images that are obtained from respective cameras provided in a first vehicle, a second vehicle that is different from the first vehicle; and a wiper controller configured to control an operation of a wiper of the first vehicle on the basis of an operation signal or an automatic control, in which the wiper is provided in an imaging direction of the cameras, and the operation signal is obtained on the basis of a manual operation performed on the first vehicle. The vehicle recognizer is configured to determine, upon a first state, whether a transition is made from the first state to a second state. The first state is a state in which the second vehicle is recognizable from the captured images obtained from the respective cameras. The second state is a state in which the second vehicle is unrecognizable from one or more of the captured images. The one or more of the captured images is obtained from all or a part of the cameras. The wiper controller is configured to automatically control the operation of the wiper on the basis of the automatic control, when the vehicle recognizer determines that the transition is made from the first state to the second state.

An aspect of the technology provides a vehicle control apparatus that includes: a vehicle recognizer configured to recognize, from captured images that are obtained from respective cameras provided in a first vehicle, a second vehicle that is different from the first vehicle; a traveling controller configured to control traveling of the first vehicle, on the basis of a result of the recognition on the second vehicle performed by the vehicle recognizer; and a wiper controller configured to control an operation of a wiper of the first vehicle on the basis of an operation signal or an automatic control, in which the wiper is provided in an imaging direction of the cameras, and the operation signal is obtained on the basis of a manual operation performed on the first vehicle. The vehicle recognizer is configured to determine, upon a first state, whether a transition is made from the first state to a second state. The first state is a state in which the second vehicle is recognizable from the captured images obtained from the respective cameras. The second state is a state in which the second vehicle is unrecognizable from one or more of the captured images. The one or more of the captured images is obtained from all or a part of the cameras. The wiper controller is configured to automatically control the operation of the wiper on the basis of the automatic control, when the vehicle recognizer determines that the transition is made from the first state to the second state.

An aspect of the technology provides a vehicle recognition device that includes circuitry configured to: recognize, from captured images that are obtained from respective cameras provided in a first vehicle, a second vehicle that is different from the first vehicle; control an operation of a wiper of the first vehicle on the basis of an operation signal or an automatic control, in which the wiper is provided in an imaging direction of the cameras, and the operation signal is obtained on the basis of a manual operation performed on the first vehicle; determine, upon a first state, whether a transition is made from the first state to a second state, in which the first state is a state in which the second vehicle is recognizable from the captured images obtained from the respective cameras, the second state is a state in which the second vehicle is unrecognizable from one or more of the captured images, and the one or more of the captured images is obtained from all or a part of the cameras; and automatically control the operation of the wiper on the basis of the automatic control, when the determination is made that the transition is made from the first state to the second state.

An aspect of the technology provides a vehicle control apparatus that includes circuitry configured to: recognize, from captured images that are obtained from respective cameras provided in a first vehicle, a second vehicle that is different from the first vehicle; control traveling of the first vehicle, on the basis of a result of the recognition on the second vehicle; control an operation of a wiper of the first vehicle on the basis of an operation signal or an automatic control, in which the wiper is provided in an imaging direction of the cameras, and the operation signal is obtained on the basis of a manual operation performed on the first vehicle; determine, upon a first state, whether a transition is made from the first state to a second state, in which the first state is a state in which the second vehicle is recognizable from the captured images obtained from the respective cameras, the second state is a state in which the second vehicle is unrecognizable from one or more of the captured images, and the one or more of the captured images is obtained from all or a part of the cameras; and automatically control the operation of the wiper on the basis of the automatic control, when the determination is made that the transition is made from the first state to the second state.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Advanced driver-assistance systems (ADAS) have been developed in recent years that assist a driving operation to be performed by a driver of a vehicle. For example, Japanese Unexamined Patent Application Publication No. 2017-210019 discloses a technique that recognizes another vehicle, in a vehicle that employs such a system.

What is desired in general is to improve an accuracy of recognition upon recognizing another vehicle.

It is desirable to provide a vehicle recognition device that is able to improve an accuracy of recognition of another vehicle, and a vehicle control apparatus that includes the vehicle recognition device.

In the following, some embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. The description of some embodiments is given in the following order.

1. Example Embodiment (an example in which a preceding vehicle is detected using a stereo camera provided in a vehicle)
2. Modification Examples 1. Example Embodiment

[Outline of Configuration]

Figure 1:
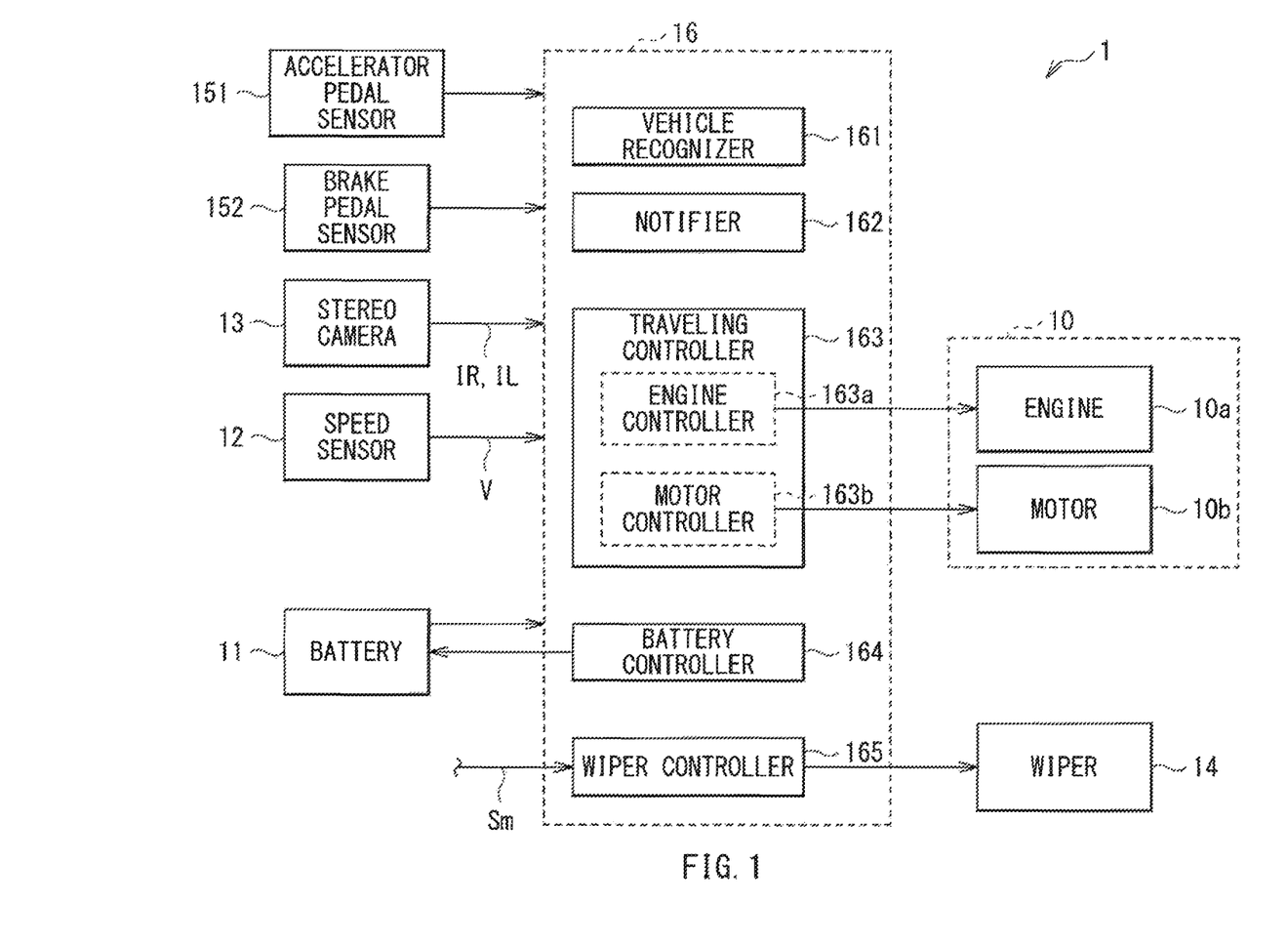
FIG. 1 is a block diagram illustrating a schematic configuration example of a vehicle that includes a vehicle recognition device and a vehicle control apparatus according to one example embodiment of the technology.

FIG. 1 is a block diagram illustrating a schematic configuration example of a vehicle 1 that includes a vehicle recognition device and a vehicle control apparatus according to an example embodiment of the technology.

Referring to FIG. 1, the vehicle 1 may include a drive source 10, a battery 11, a speed sensor 12, a stereo camera 13, a wiper 14, an accelerator pedal sensor 151, a brake pedal sensor 152, and a vehicle controller 16.

In one embodiment, a vehicle recognizer 161, a notifier 162, and a wiper controller 165 may serve as a "vehicle recognition device".

[A. Drive Source 10]

The vehicle 1 may include, as the drive source 10, an engine 10a serving as an internal combustion engine and a motor 10b serving as an electric motor, as illustrated in FIG. 1. In other words, in an example embodiment, the vehicle 1 may be a hybrid electric vehicle (HEV) having the engine 10a and the motor 10b as the drive source 10.

The vehicle 1 may thus have three types of traveling modes including: a hybrid traveling mode in which both the engine 10a and the motor 10b serve as the drive source; an engine traveling mode in which the engine 10a serves solely as the drive source; and a motor traveling mode in which the motor 10b solely serves as the drive source. These three types of traveling modes may be switched on an as-needed basis to be used in response to, for example, traveling conditions of the vehicle 1.

[B. Battery 11]

A battery 11 may store electric power to be used by the vehicle 1. The battery 11 may be any of various secondary batteries, such as a lithium-ion battery. The battery 11 may store electric power, or charged power, charged from the outside of the vehicle 1, and regenerative electric power supplied from the motor 10b, for example.

[C. Speed Sensor 12]

The speed sensor 12 may detect a speed V of the vehicle 1 upon traveling of the vehicle 1. The speed V detected by the speed sensor 12 may be outputted to the vehicle controller 16, such as to a later-described traveling controller 163, as illustrated in FIG. 1.

In one embodiment, the speed V may serve as a "speed" or a "speed of the first vehicle".

[D. Stereo Camera 13 and Wiper 14]

The stereo camera may be an imaging unit that performs imaging of a situation, or a traveling environment, around the vehicle 1 and detects the situation or the traveling environment around the vehicle. The wiper 14 may wipe an unclean substance such as a dirt or stains attached to a window of the vehicle 1. In an example embodiment, the wiper 14 may wipe the unclean substance attached to a later-described windshield 17F.

Figure 2:
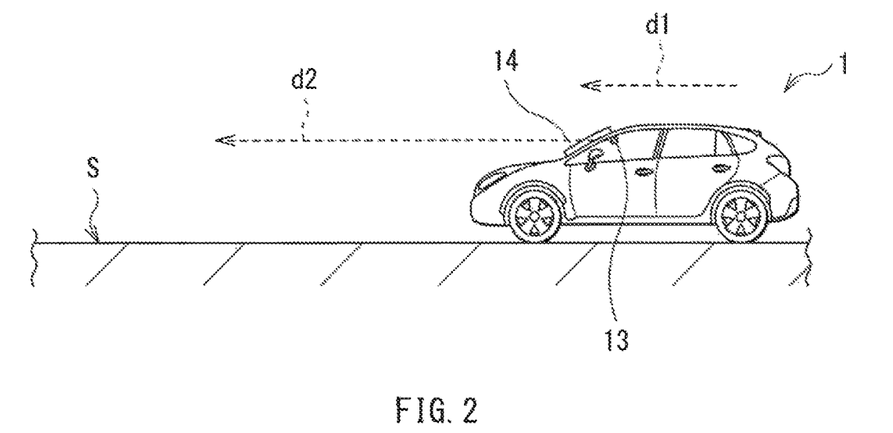
FIG. 2 is a diagram schematically illustrating an example of arrangement, in the vehicle, of a stereo camera and a wiper illustrated in FIG. 1.
Figure 3:
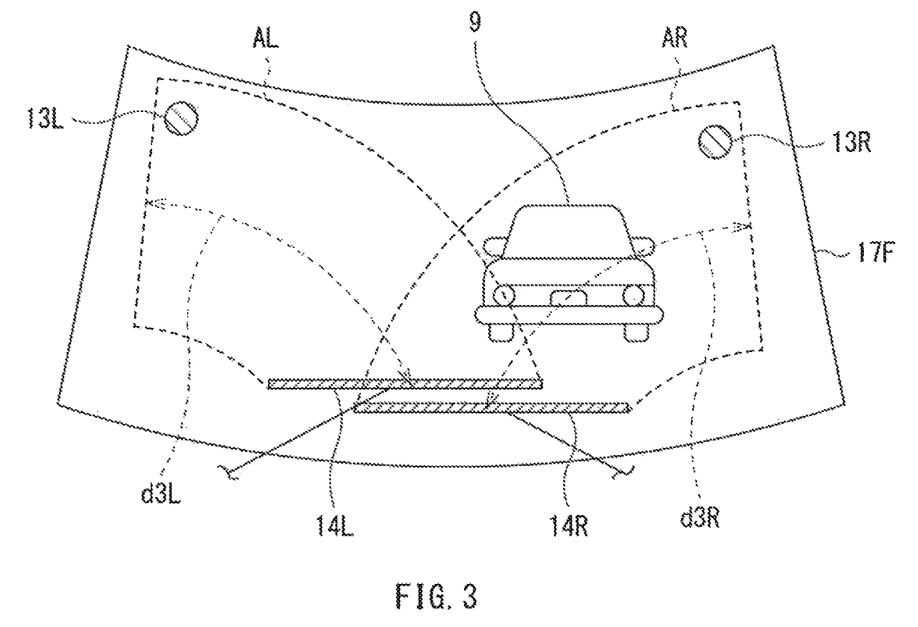
FIG. 3 is a diagram schematically illustrating an example of an operation of the stereo camera and the wiper illustrated in FIG. 2.

FIG. 2 schematically illustrates an example of arrangement of the stereo camera 13 and the wiper 14 in the vehicle 1. FIG. 3 schematically illustrates an example of an operation of the stereo camera 13 and the wiper 14 illustrated in FIG. 2. FIG. 3 illustrates an example of portions around the windshield 17F as viewed from the interior of the vehicle 1.

Referring to FIG. 3, the stereo camera 13 may have two cameras including a right camera 13R and a left camera 13L. The right camera 13R and the left camera 13L may be disposed inside the vehicle 1, or inside the body of the vehicle 1, as illustrated in FIGS. 2 and 3. In one example, the right camera 13R and the left camera 13L may be disposed at a location in the vehicle 1 which is near the windshield 17F, or which is around the seats. The right camera 13R and the left camera 13L each may perform imaging in an imaging direction d2 illustrated in FIG. 2, and may respectively output captured images IR and IL obtained by the imaging as illustrated in FIG. 1. In one example illustrated in FIG. 2, the imaging direction d2 may be a direction ahead of the vehicle 1 that travels in a traveling direction d1. The captured images IR and IL thus obtained by the stereo camera 13, i.e., respectively obtained by the right camera 13R and the left camera 13L, may be outputted to the vehicle controller 16, such as to the later-described vehicle recognizer 161 and traveling controller 163, as illustrated in FIG. 1.

In one embodiment, the stereo camera 13, or the right camera 13R and the left camera 13L, may serve as a "plurality of cameras" or "cameras".

The wiper 14 is disposed on a side of the vehicle 1 which is in the imaging direction d2 of the stereo camera 13 that includes the right camera 13R and the left camera 13L, as illustrated in FIG. 2. In other words, the wiper 14 may be disposed outside of the windshield 17F. The wiper 14 may have two wipers including a right wiper 14R and a left wiper 14L that respectively correspond to the right camera 13R and the left camera 13L. In an example embodiment, the right wiper 14R may so operate as to wipe an imaging region on the windshield 17F positioned ahead of the right camera 13R, as can be seen from an operating direction d3R and an operation region AR illustrated in FIG. 3. Further, the left wiper 14L may so operate as to wipe an imaging region on the windshield 17F positioned ahead of the left camera 13L, as can be seen from an operating direction d3L and an operation region AL illustrated in FIG. 3.

The wiper 14 (e.g., the wipers 14R and 14L) may operate on the basis of a control performed by the later-described wiper controller 165 provided in the vehicle controller 16.

[E. Accelerator Pedal Sensor 151 and Brake Pedal Sensor 152]

The accelerator pedal sensor 151 may detect an amount of pressing down of an unillustrated accelerator pedal pressed by a driver of the vehicle 1. In other words, the accelerator pedal sensor 151 may detect a position of an accelerator. The brake pedal sensor 152 may detect an amount of pressing down of an unillustrated brake pedal pressed by the driver of the vehicle 1. In other words, the brake pedal sensor 152 may detect a position of the brake pedal.

The positions of the accelerator pedal and the brake pedal thus respectively detected by the accelerator pedal sensor 151 and the brake pedal sensor 152 may be outputted to the vehicle controller 16, such as to a later-described traveling controller 163, as illustrated in FIG. 1.

[F. Vehicle Controller 16]

The vehicle controller 16 may control various operations to be performed in the vehicle 1, or may perform various calculation processes. For example, the vehicle controller 16 may include: a microprocessor that performs a calculation; a read-only memory (ROM) that stores a program or data that causes the microprocessor to execute each process; a random-access memory (RAM) that stores various pieces of data, such as data related to a result of the calculation; a backup RAM that holds a content stored in the RAM; and an input output interface (I/F).

In an example embodiment illustrated in FIG. 1, the vehicle controller 16 may include the vehicle recognizer 161, the notifier 162, the traveling controller 163 (a hybrid controller), a battery controller 164, and the wiper controller 165.

In one embodiment, the vehicle controller 16 may serve as a "vehicle control apparatus".

[F-1. Vehicle Recognizer 161]

The vehicle recognizer 161 may perform a predetermined calculation process such as an image recognition process, on the basis of the captured images IR and IL obtained by the stereo camera 13, i.e., respectively obtained by the right camera 13R and the left camera 13L. Through performing the predetermined calculation process, the vehicle recognizer 161 recognizes another vehicle 9 that is different from the vehicle 1, or the "own vehicle". In an example embodiment illustrated in FIG. 3, the vehicle recognizer 161 may recognize, as another vehicle 9, a preceding vehicle that travels ahead of the vehicle 1. In one embodiment, the vehicle 1 may serve as a "first vehicle". In one embodiment, another vehicle 9 may serve as a "second vehicle".

The vehicle recognizer 161 determines, upon a both-side recognition state (or a "stable state") S1, whether a transition is made from the both-side recognition state S1 to a one-side recognition state (or an "interpolated state") S2 or to an unrecognizable state S3. The both-side recognition state S1, the one-side recognition state, and the unrecognizable state S3 are described later in greater detail.

Figure 4A:
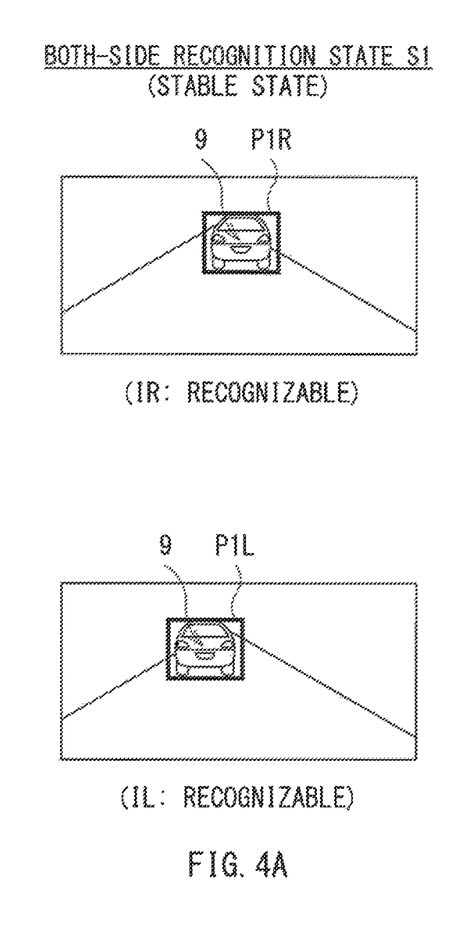
FIGS. 4A to 4C are diagrams each schematically illustrating an example of states of recognition of another vehicle by the stereo camera.
Figure 4B:
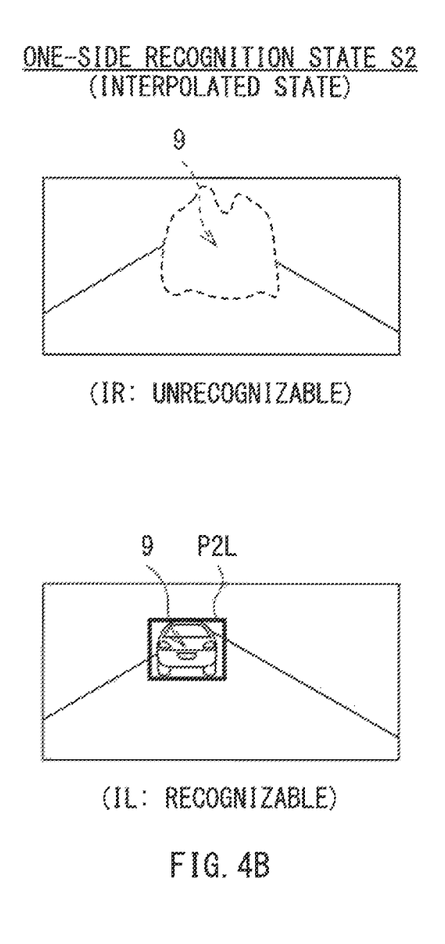
Figure 4C:
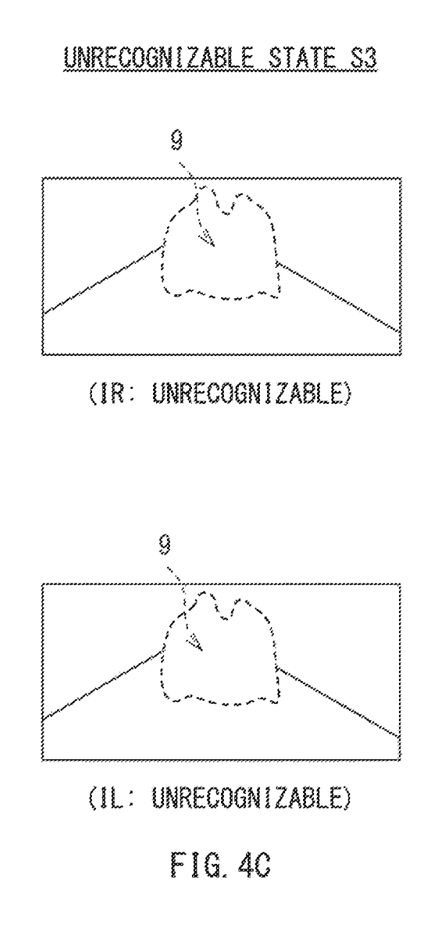

FIGS. 4A to 4C each schematically illustrate an example of states of recognition of another vehicle 9 by the stereo camera 13, i.e., by the right camera 13R and the left camera 13L. Note that "P1R", "P1L", and "P2L" in FIGS. 4A and 4B each indicate a result of recognition of a vehicle, and each indicate that another vehicle 9 (e.g., the preceding vehicle) is successfully recognized on the basis of the captured image IR or the captured image IL.

FIG. 4A illustrates an example of the both-side recognition state (the stable state) S1. In an example embodiment, another vehicle 9 is recognizable in the both-side recognition state S1, on the basis of the captured images IR and IL obtained from all of the cameras out of the right camera 13R and the left camera 13L, i.e., obtained from both of the right camera 13R and the left camera 13L. In other words, another vehicle 9 is recognizable on the basis of both of the captured images IR and IL in the both-side recognition state S1, as denoted by the reference signs "P1R" and "P1L" of FIG. 4A. This means that the both-side recognition state S1 allows an intervehicle distance L between the vehicle 1 and another vehicle 9 to be determined stably on the basis of both of the captured images IR and IL. Thus, the both-side recognition state S1 may be paraphrased as the "stable state".

FIG. 4B illustrates an example of the one-side recognition state (the interpolated state) S2. In an example embodiment, another vehicle 9 is unrecognizable in the one-side recognition state S2, on the basis of the captured image (the captured image IR in the illustrated embodiment) obtained from a part of the cameras (the right camera 13R in the illustrated embodiment) out of the right camera 13R and the left camera 13L. In other words, in the one-side recognition state S2, another vehicle 9 is recognizable on the basis of one of the captured images, i.e., the captured image IL, as denoted by the reference sign "P2L" of FIG. 4B, but is unrecognizable on the basis of the other of the captured images, i.e., the captured image IR. Accordingly, the one-side recognition state S2 may allow the intervehicle distance L between the vehicle 1 and another vehicle 9 through a predetermined interpolation process, on the basis of the captured image IL by which another vehicle 9 is recognizable. For example, the interpolation process may interpolate image information or distance information.

FIG. 4C illustrates an example of the unrecognizable state S3. In an example embodiment, another vehicle 9 is unrecognizable in the unrecognizable state S3, on the basis of the captured images IR and IL obtained from all of the cameras out of the right camera 13R and the left camera 13L, i.e., obtained from both of the right camera 13R and the left camera 13L. In other words, in the unrecognizable state S3, another vehicle 9 is unrecognizable on the basis of both of the captured images IR and IL. Accordingly, the unrecognizable state S3 may not allow for the calculation of the intervehicle distance L between the vehicle 1 and another vehicle 9.

Note that processes to be performed by the vehicle recognizer 161, including a vehicle recognition process and a determining process, are described later in greater detail with reference to FIG. 5.

In one embodiment, the both-side recognition state (or the stable state) S1 may serve as a "first state". In one embodiment, the one-side recognition state S2 (or the interpolated stated) and the unrecognizable state S3 each may serve as a "second state".

[F-2. Notifier 162]

The notifier 162 may notify the driver of the vehicle 1 of various pieces of information, or may issue a warning to the driver. In one example, the notifier 162 may notify or warn the driver through displaying characters or an image, outputting a sound or a voice, or performing any other action that notifies or warns the driver. In an example embodiment, the notifier 162 may notify the driver of the vehicle 1 of information on the transition from the both-side recognition state S1 to the one-side recognition state S2 or to the unrecognizable state S3, in a case where the vehicle recognizer 161 has determined, or has obtained a result of the determination, that the transition is made from the both-side recognition state S1 to the one-side recognition state S2 or to the unrecognizable state S3. Note that a notification process to be performed by the notifier 162 is described later in greater detail with reference to FIG. 5.

[F-3. Traveling Controller 163]

The traveling controller 163 controls traveling of the vehicle 1. For example, the traveling controller 163 may perform controls related to the traveling of the vehicle 1 in an integrated fashion. In an example embodiment illustrated in FIG. 1, the traveling controller 163 may include an engine controller 163a and a motor controller 163b.

The engine controller 163a may control various operations related to the engine 10a as illustrated in FIG. 1. For example, the engine controller 163a may be a so-called engine control unit (ECU).

The motor controller 163b may control various operations related to the motor 10b as illustrated in FIG. 1. For example, the motor controller 163b may control the motor 10b to drive wheels of the vehicle 1, and may control the motor 10b to perform the regeneration.

In an example embodiment, the traveling controller 163 controls the traveling of the vehicle 1, on the basis of a result of the recognition on another vehicle 9 performed by the vehicle recognizer 161. In one example, the traveling controller 163 may control the traveling of the vehicle 1, on the basis of the intervehicle distance L between the vehicle 1 and another vehicle 9. For example, the traveling controller 163 may increase or decrease a factor such as the intervehicle distance L or the speed V, to thereby perform an adaptive cruise control relative to another vehicle 9 such as the preceding vehicle, or to thereby perform an automatic acceleration-deceleration control that automatically controls deceleration and/or acceleration of the vehicle 1. Note that a traveling control process of the vehicle 1 to be performed by the traveling controller 163 is described later in greater detail with reference to FIG. 5.

[F-4. Battery Controller 164]

The battery controller 164 may perform various controls on the battery 11 as illustrated in FIG. 1. For example, the battery controller 164 may control charging of the battery 11.

[F-5. Wiper Controller 165]

The wiper controller 165 controls an operation of the wiper 14, i.e., an operation of each of the wipers 14R and 14L. The wiper controller 165 controls the operation of the wiper 14 on the basis of an operation signal Sm as illustrated in FIG. 1. The operation signal Sm is obtained on the basis of a manual operation performed on the vehicle 1 by the driver or an occupant. The wiper controller 165 also controls the operation of the wiper 14 on the basis of an automatic control. For example, the wiper controller 165 may so control the operation of each of the wipers 14R and 14L as to cause the wipers 14R and 14L to respectively wipe (as denoted by the operating directions d3R and d3L) the operation regions AR and AL (i.e., regions to be wiped) on the windshield 17F as illustrated in FIG. 3.

Further, in an example embodiment, the wiper controller 165 automatically controls the operation of the wiper 14 (one or both of the wipers 14R and 14L) on the basis of the automatic control, not on the basis of the operation signal Sm, in the case where the vehicle recognizer 161 has determined, or has obtained the result of the determination, that the transition is made from the both-side recognition state S1 to the one-side recognition state S2 or to the unrecognizable state S3. Note that a control process to be performed by the wiper controller 165 is described later in greater detail with reference to FIG. 5.

[Operation, Workings, and Example Effects]

Operations, workings, and some example effects of the vehicle 1 according to an example embodiment are now described in detail with reference to a comparative example.

[A. Comparative Example]

In general, an unclean substance such as a raindrop can attach in an imaging region of a stereo camera upon traveling of a vehicle. For example, the unclean substance can attach onto a windshield. The attachment of the unclean substance can make difficult a calculation, which utilizes right and left captured images obtained by the stereo camera, of an intervehicle distance between an own vehicle and another vehicle such as a preceding vehicle. For example, another vehicle 9 becomes unrecognizable on the basis of one of the captured images (e.g., the captured image IR) in the one-side recognition state S2 as illustrated in FIG. 4B, and becomes unrecognizable on the basis of both of the captured images IR and IL in the unrecognizable state S3 as illustrated in FIG. 4C. Accordingly, the attachment of the unclean substance can make another vehicle 9 difficult to recognize when the transition is made, to the one-side recognition state S2 or to the unrecognizable state S3 (i.e., a low-visibility state), from the both-side recognition state (or the stable state) S1 in which another vehicle 9 is recognizable on the basis of both of the captured images IR and IL.

Under such circumstances, it is possible to prevent another vehicle 9 from becoming difficult to recognize if the driver of the vehicle operates the wiper through the manual operation to wipe the attached unclean substance by the wiper. In some cases, however, the driver is unaware of the transition from the both-side recognition state S1 to the one-side recognition state S2 or to the unrecognizable state S3. For example, the driver can be unaware of the transition when it starts to rain, when water has splashed from the preceding vehicle onto the own vehicle after the rain, or when water has dropped from a tree after the rain.

It is to be noted that the intervehicle distance between the own vehicle and another vehicle is still determinable on the basis of the remaining captured image (e.g., the captured image IL by which another vehicle 9 is kept recognizable in an example illustrated in FIG. 4B) that is other than the captured image by which another vehicle 9 is unrecognizable. For example, the predetermined interpolation process based on the remaining captured image may be performed to determine the intervehicle distance. The interpolation process may interpolate image information or distance information. Unfortunately, even when the interpolation process is performed to determine the intervehicle distance, the transition may possibly be made to the unrecognizable state S3 if the driver is unaware of the transition to the one-side recognition state S2 from the both-side recognition state S1 and the attachment of the unclean substance, such as the raindrop, gradually worsens accordingly. In this case, another vehicle becomes unrecognizable eventually. In other words, the calculation of the intervehicle distance based on the interpolation process becomes unperformable eventually.

Accordingly, vehicles in general, such as the vehicle according to the comparative example, can involve a decrease in accuracy of recognition upon recognizing another vehicle. Further, the decrease in the recognition accuracy of another vehicle can lead to difficulties in appropriately controlling the traveling of the vehicle, which in turn lead to a decrease in traveling stability of the vehicle.

[B. Vehicle Control Process According to Example Embodiment]

An example embodiment may perform the following example technique to carry out control processes to be performed upon traveling of the vehicle 1. In other words, an example embodiment may perform the control process of the wiper 14 and the traveling control process of the vehicle 1 that are based on a state of recognition of another vehicle 9 in the following example manner.

In the following, with reference to FIG. 5 in addition to FIGS. 1 to 4, a description is given in detail of an example of the control processes, including the above-described various control processes based on the state of recognition of another vehicle 9. FIG. 5 is a flowchart illustrating an example of the control processes performed in the vehicle 1 according to an example embodiment.

Figure 5:
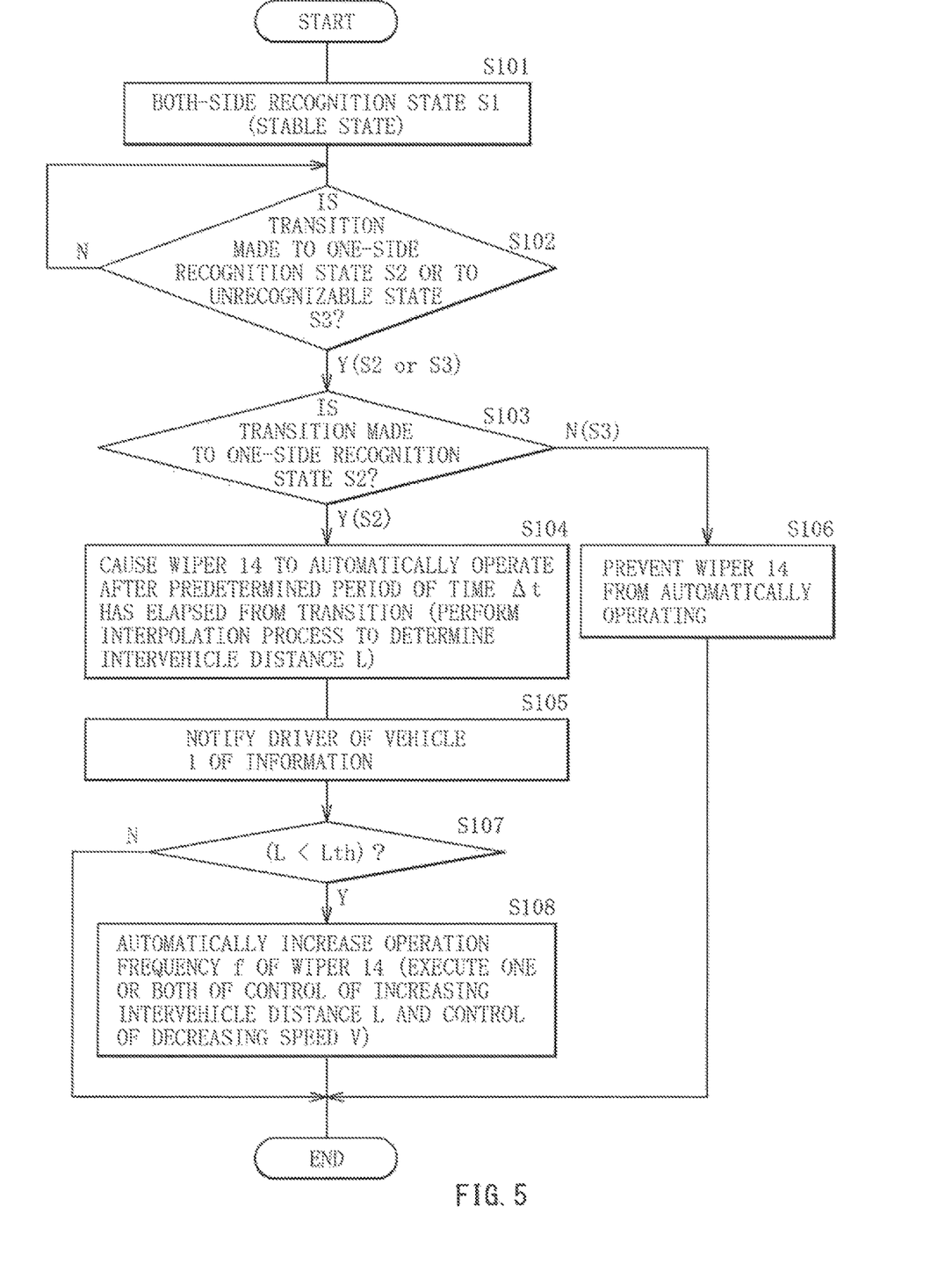
FIG. 5 is a flowchart illustrating an example of control processes performed in the vehicle according to one example embodiment.

A series of processes illustrated in FIG. 5 may first start with the both-side recognition state (the stable state) S1 (step S101). For example, in step S101, another vehicle 9 (e.g., the preceding vehicle) is recognizable on the basis of both of the captured images IR and IL respectively obtained by the right camera 13R and the left camera 13L, as denoted by the reference signs "P1R" and "P1L" of FIG. 4A.

Thereafter, the vehicle recognizer 161 determines, upon the both-side recognition state S1, whether the transition is made from the current both-side recognition state S1 to the one-side recognition state (the interpolated state) S2 or to the unrecognizable state S3 (step S102). For example, the vehicle recognizer 161 may determine whether a change has occurred from a state in which another vehicle 9 is recognizable to a state in which another vehicle 9 is unrecognizable in one or both of the captured images IR and IL, as illustrated in FIGS. 4B and 4C.

If the vehicle recognizer 161 determines, or obtains a result of the determination, that the transition is not made from the both-side recognition state S1 to the one-side recognition state S2 or to the unrecognizable state S3 (step S102: N), the series of processes may execute the determination performed in step S102 again.

If the vehicle recognizer 161 determines, or obtains a result of the determination, that the transition is made from the both-side recognition state S1 to the one-side recognition state S2 or to the unrecognizable state S3 (step S102: Y), the vehicle recognizer 161 may thereafter determine whether the state following the transition is the one-side recognition state S2 (step S103). For example, the vehicle recognizer 161 may determine whether a change has occurred from the state in which another vehicle 9 is recognizable to the state in which another vehicle 9 is unrecognizable in only one of the captured images IR and IL as illustrated in FIG. 4B, or a change has occurred from the state in which another vehicle 9 is recognizable to the state in which another vehicle 9 is unrecognizable in both of the captured images IR and IL as illustrated in FIG. 4C.

Note that, in an example embodiment, the wiper controller 165 controls the operation of the wiper 14 as described later in greater detail, in both of the cases where the transition is made from the both-side recognition state S1 to the one-side recognition state S2 and where the transition is made from the both-side recognition state S1 to the unrecognizable state S3. In other words, in both of the cases, the wiper controller 165 automatically controls the operation of the wiper 14 on the basis of the automatic control, not on the basis of the operation signal Sm, as described later with reference to step S104 or step S106.

If the vehicle recognizer 161 determines that the state following the transition is the one-side recognition state S2 (step S103: Y), or obtains a result of the determination that the transition is made from the both-side recognition state S1 to the one-side recognition state S2, the wiper controller 165 may thereafter cause the wiper 14 to automatically operate (step S104). In an example embodiment, the wiper controller 165 may cause the wiper 14 to automatically operate after a predetermined period of time Δt has elapsed from the transition to the one-side recognition state S2 from the both-side recognition state S1. For example, the predetermined period of time Δt may be about 5 seconds, although the predetermined period of time Δt may take any number of seconds.

Further, the vehicle recognizer 161 may determine the intervehicle distance L between the vehicle 1 and another vehicle 9, on the basis of the remaining captured image (e.g., the captured image IL by which another vehicle 9 is kept recognizable in the example illustrated in FIG. 4B) that is other than the captured image by which another vehicle 9 is unrecognizable. For example, the vehicle recognizer 161 may perform the predetermined interpolation process based on the remaining captured image to determine the intervehicle distance L (i.e., an example embodiment in parenthesis in step S104). For example, the interpolation process may interpolate image information or distance information. In one example, upon performing the interpolation process, the intervehicle distance L between the vehicle 1 and the another vehicle 9 and a size of another vehicle 9 recognized in one of the captured images (e.g., the captured image IR or the captured image IL) may be associated with each other in advance in the both-side recognition state S1. With this configuration, the size of another vehicle 9 is still recognizable in one of the captured images (e.g., the captured image IR or the captured image IL) even when the transition is made from the both-side recognition state S1 to the one-side recognition state S2, making it possible to determine the intervehicle distance L between the vehicle 1 and another vehicle 9 on the basis of the correspondence relationship between the intervehicle distance L and the size of another vehicle 9 obtained in advance in the both-side recognition state S1.

In an example embodiment, after executing step S104, the notifier 162 may notify the driver of the vehicle 1 of information (step S105). For example, the notifier 162 may notify the driver of the vehicle 1 of information that the transition is made from the both-side recognition state S1 to the one-side recognition state S2. The notifier 162 may also notify any other information. In one example, the notifier 162 may notify or warn the driver through displaying characters or an image, outputting a sound or a voice, or performing any other action that notifies or warns the driver as described above.

In step S103, if the vehicle recognizer 161 determines that the state following the transition is the unrecognizable state S3 (step S103: N), or obtains a result of the determination that the transition is made from the both-side recognition state S1 to the unrecognizable state S3, the wiper controller 165 may prevent the wiper 14 from automatically operating (step S106). One reason is that the direct transition from the both-side recognition state S1 to the unrecognizable state S3 without undergoing the one-side recognition state S2 is highly likely due to traveling of another vehicle 9 to a location outside a region in which the captured images are obtainable by the stereo camera 13, rather than due to a situation where another vehicle 9 becomes unrecognizable by the attachment of the unclean substance. For example, the sudden transition from the both-side recognition state S1 to the unrecognizable state S3 may possibly occur when another vehicle 9 has traveled to a traveling path different from a traveling path along which the vehicle 1 travels. In this case, the series of processes, or the control processes of the vehicle 1, illustrated in FIG. 5 may end. In one example, the series of processes may end after a predetermined period of time has elapsed.

After step S105, i.e., after the wiper controller 165 has caused the wiper 14 to automatically operate in step S104, the vehicle recognizer 161 may thereafter determine whether the intervehicle distance L determined in step S104 is less than a predetermined threshold Lth (L<Lth) (step S107). If the vehicle recognizer 161 determines that the intervehicle distance L is equal to or greater than the threshold Lth (L≥Lth) (step S107: N), the series of processes, or the control processes of the vehicle 1, illustrated in FIG. 5 may end. One reason is that the vehicle 1 and another vehicle 9 are sufficiently distant from each other.

If the vehicle recognizer 161 determines that the intervehicle distance L is less than the threshold Lth (step S107: Y), the wiper controller 165 may thereafter automatically increase frequency of operation (i.e., operation frequency) "f" of the wiper 14 (step S108). One reason is that the vehicle 1 and another vehicle 9 are not sufficiently distant from each other, or are close to each other. With this configuration, the wiper controller 165 may automatically increase the operation frequency f of the wiper 14 to thereby promote returning of the current state, i.e., the one-side recognition state S2, to the initial state, i.e., the both-side recognition state S1, in an example case where the intervehicle distance L between the vehicle 1 and another vehicle 9 becomes small or in an example case where another vehicle 9 becomes closer to the vehicle 1. In an example embodiment, the wiper controller 165 may automatically increase the operation frequency f of the wiper 14 even when the wiper 14 is already in operation. The wiper controller 165 may cause the wiper 14 to return to the original state in a case where the current state, i.e., the one-side recognition state S2, does not return to the initial state, i.e., the both-side recognition state S1, even when a predetermined period of time has elapsed from the increase in the operation frequency f of the wiper 14. In one example, the wiper controller 165 may cause the operation frequency f to return to the original operation frequency, or may stop the wiper 14.

In an alternative example embodiment, the traveling controller 163 may also perform a traveling control on the basis of a result of the recognition of another vehicle 9, in the example case where the intervehicle distance L between the vehicle 1 and another vehicle 9 becomes small or where another vehicle 9 becomes closer to the vehicle 1. In one example, on the basis of the result of the recognition of another vehicle 9, such as the recognition on the intervehicle distance L, the traveling controller 163 may execute one or both of a control of increasing the intervehicle distance L and a control of decreasing the speed V (i.e., an example embodiment in parenthesis in step S108). For example, the traveling controller 163 may increase or decrease a factor such as the intervehicle distance L or the speed V to thereby perform the adaptive cruise control relative to another vehicle 9 such as the preceding vehicle, or to thereby perform the automatic acceleration-deceleration control that automatically controls deceleration and/or acceleration of the vehicle 1.

It is to be noted that a combination of whether to execute the traveling control (such as increasing or decreasing the intervehicle distance L, the speed V, etc.) and whether to notify the driver of the vehicle 1 of the information, timings of executing the traveling control and the notification, conditions of executing the traveling control and the notification, and/or any other factor related to the execution of the traveling control and the notification, are not limited to those illustrated in one example illustrated in FIG. 5. An alternative example embodiment may employ any other combination of whether to execute the traveling control and whether to notify the driver of the vehicle 1 of the information, other timings of executing the traveling control and the notification, and/or other conditions of executing the traveling control and the notification.

The series of processes, i.e., the control processes of the vehicle 1, illustrated by way of example in FIG. 5 may end after step S108.

[C. Workings and Example Effects]

According to an example embodiment, the vehicle recognizer 161 of the vehicle 1 determines, upon the both-side recognition state S1, whether the transition is made from the both-side recognition state S1 to the one-side recognition state S2 or to the unrecognizable state S3. Further, the wiper controller 165 automatically controls the operation of the wiper 14 on the basis of the automatic control, when the vehicle recognizer 161 has determined that the transition is made from the both-side recognition state S1 to the one-side recognition state S2 or to the unrecognizable state S3.

Thus, according to an example embodiment, the operation of the wiper 14 is automatically controlled even when, for example, the driver of the vehicle 1 is unaware of the transition from the both-side recognition state S1 to the one-side recognition state S2 or to the unrecognizable state S3 (i.e., even when the operation signal Sm based on the manual operation is not obtained), making it possible to recognize another vehicle 9 easily, e.g., making it easier to return to the both-side recognition state S1. Hence, it is possible for the example embodiment to improve an accuracy of the recognition of another vehicle 9, as compared with the comparative example or a typical case. Further, an example embodiment controls the traveling of the vehicle 1 on the basis of the result of the recognition of another vehicle 9, such as the recognition on the intervehicle distance L between the vehicle 1 and another vehicle 9, making it possible to improve the traveling stability of the vehicle 1 as well.

In addition, the wiper controller 165 may cause the wiper 14 to automatically operate when the vehicle recognizer 161 determines that the transition is made from the both-side recognition state S1 to the one-side recognition state S2. Thus, the attached unclean substance is wiped by actually operating the wiper 14 automatically, making it easier to recognize another vehicle 9, i.e., making it easier to return to the both-side recognition state S1. Hence, it is possible to improve the accuracy of the recognition of another vehicle 9.

The wiper controller 165 may automatically increase the operation frequency f of the wiper 14 when the intervehicle distance L, determined on the basis of the remaining captured image (e.g., the captured image IL obtained by the left camera 13L in the example illustrated in FIG. 4B), is less than the threshold Lth after the wiper controller 165 has caused the wiper 14 to automatically operate. Thus, the operation frequency f of the wiper 14 is automatically increased by the wiper controller 165 to thereby promote the returning to the both-side recognition state S1 in an example case where the intervehicle distance L between the vehicle 1 and another vehicle 9 becomes small or where another vehicle 9 becomes closer to the vehicle 1. Hence, it is possible to further improve the accuracy of the recognition of another vehicle 9.

The wiper controller 165 may cause the wiper 14 to automatically operate after the predetermined period of time Δt has elapsed from the transition to the one-side recognition state S2 from the both-side recognition state S1. Thus, the wiper 14 is caused to automatically operate by the wiper controller 165 after the elapse of the predetermined period of time Δt, instead of immediately after the transition to the one-side recognition state S2. Hence, it is possible to prevent an unnecessary operation of the wiper 14 due to, for example, an erroneous determination on whether to make the transition from the both-side recognition state S1 to the one-side recognition state S2.

The wiper controller 165 may prevent the wiper 14 from automatically operating when the vehicle recognizer 161 determines that the transition is made from the both-side recognition state S1 to the unrecognizable state S3. One reason is that the direct transition from the both-side recognition state S1 to the unrecognizable state S3 is highly likely due to the traveling of another vehicle 9 to a location outside the region in which the captured images are obtainable by the stereo camera 13, rather than due to a situation where another vehicle 9 becomes unrecognizable by the attachment of the unclean substance, as described above. Hence, it is possible to prevent the unnecessary operation of the wiper 14.

The notifier 162 may notify the driver of the vehicle 1 of, for example, the information on the transition from the both-side recognition state S1 to the one-side recognition state S2 or to the unrecognizable state S3, when the vehicle recognizer 161 has determined that the transition is made from the both-side recognition state S1 to the one-side recognition state S2 or to the unrecognizable state S3. Thus, even when the driver of the vehicle 1 is unaware of the transition to the one-side recognition state S2 or to the unrecognizable state S3, it is possible to, for example, prompt the driver to increase the intervehicle distance L between the vehicle 1 and another vehicle 9 or to decrease the speed V of the vehicle 1 by performing the notification.

The traveling controller 163 may execute a control, such as the control of increasing the intervehicle distance L or the control of decreasing the speed V, on the basis of the result of the recognition of another vehicle 9, such as the recognition on the intervehicle distance L. Thus, the traveling controller 163 may perform such a traveling control when the intervehicle distance L between the vehicle 1 and another vehicle 9 becomes small or when another vehicle 9 becomes closer to the vehicle 1, making it possible to secure, for example, the traveling stability of the vehicle 1. Further, performing the traveling control highly likely allows the vehicle 1 to lose track of another vehicle 9 thereafter, making it possible to prevent instability in the recognition of another vehicle 9 from continuing as well.

2. Modification Examples

Although some example embodiments of the technology have been described in the foregoing, the technology is by no means limited to the example embodiments described above. Various changes and modifications may be made to any embodiment without departing from the scope of the technology.

For example, the configurations, such as type, shape, arrangement, material, the number of pieces, of the respective members of the vehicle 1 are not limited to those described in the above-described example embodiment. An alternative example embodiment may employ type, shape, arrangement, material, the number of pieces, etc., other than those described with reference to the example embodiment. In addition, values, ranges, magnitude relationships, etc., of the various parameters described in the foregoing example embodiment are illustrative and non-limiting. An alternative example embodiment may employ other values, ranges, magnitude relationships, etc.

Further, although an example embodiment has been described above in which a single motor, i.e., the motor 10b, is provided in the vehicle 1, an alternative example embodiment may include two or more motors. Further, an example embodiment has been described above in which the vehicle 1 is the hybrid electric vehicle (HEV). The vehicle 1, however, is not limited to the hybrid electric vehicle. Any embodiment of the technology is applicable to any vehicle, such as an electric vehicle (EV) or a gasoline vehicle.

Moreover, an example embodiment has been described above with specific reference to the control processes of the vehicle 1, including the control process of the wiper 14 and the traveling control process of the vehicle 1 that are based on a state of recognition of another vehicle 9. The control processes of the vehicle 1, however, are not limited to those described above. An alternative example embodiment may perform the control processes or any other process of the vehicle 1 on the basis of any other method. For example, although the preceding vehicle is recognized as another vehicle 9 in an example embodiment described above, another vehicle 9 is not limited to the preceding vehicle. An alternative example embodiment may recognize any other vehicle as another vehicle 9, such as a subsequent vehicle that runs behind the vehicle 1, or a vehicle that runs side-by-side with the vehicle 1 (i.e., a vehicle that runs on the right side of the vehicle 1, a vehicle that runs on the left side of the vehicle 1, or both).

Moreover, an example embodiment has been described above in which the stereo camera, i.e., the two cameras including the right camera 13R and the left camera 13L, is provided that serves as the "plurality of cameras" or the "cameras" in one embodiment, and in which one of those two cameras serves as the "part of the cameras" in one embodiment. The cameras, however, are not limited to those described above. An alternative example embodiment may include three or more cameras that serve as the "plurality of cameras" or the "cameras" in one embodiment. Further, an example embodiment has been described above in which the stereo camera 13 is disposed inside the body of the vehicle 1. A location of the stereo camera 13, however, is not limited thereto. An alternative example embodiment may dispose the stereo camera 13 outside the body of the vehicle 1. In such an alternative example embodiment, the vehicle 1 may include the wiper 14 that wipes the windshield 17F, and a dedicated wiper that is provided separately from the wiper 14 and wipes the stereo camera 13.

The series of processes in an example embodiment described above may be performed by hardware (circuit) or software (program). In an example embodiment where the processes are performed by the software, the software includes a program group that causes a computer to execute each function. When using each program, each program may be incorporated in the computer in advance, or may be installed in the computer from a network or a computer readable medium.

Furthermore, the various embodiments and examples described above may be applied in any combination. The technology encompasses an embodiment based on such a combination as well.

The example effects described above are merely illustrative and non-limiting. Any embodiment may achieve an effect other than the example effects described above.

Accordingly, the vehicle recognition device and the vehicle control apparatus according to an example embodiment are able to improve the accuracy of recognition of another vehicle.

Although the technology has been described in terms of exemplary embodiments, it is not limited thereto. It should be appreciated that variations may be made in the described embodiments by persons skilled in the art without departing from the scope of the technology as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

The vehicle controller 16 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle controller 16. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle controller 16 illustrated in FIG. 1.

The invention claimed is:

1. A vehicle recognition device comprising:
a vehicle recognizer configured to recognize, from captured images that are obtained from respective cameras provided in a first vehicle, a second vehicle that is different from the first vehicle; and
a wiper controller configured to control an operation of a wiper of the first vehicle on a basis of an operation signal or an automatic control, the wiper being provided in an imaging direction of the cameras, the operation signal being obtained on a basis of a manual operation performed on the first vehicle wherein:
the wiper controller is configured to automatically increase frequency of the operation of the wiper when an intervehicle distance between the first vehicle and the second vehicle becomes less than a threshold after the wiper controller has caused the wiper to automatically operate,
the intervehicle distance is determined based on remaining one or more of the captured images obtained from remaining one or more of cameras excluding a part of the one or more cameras,
the vehicle recognizer being configured to determine, upon a first state, whether a transition is made from the first state to a second state, the first state being a state in which the second vehicle is recognizable from the captured images obtained from the respective cameras, the second state being a state in which the second vehicle is unrecognizable from one or more of the captured images, the one or more of the captured images being obtained from all or the part of the cameras, and
the wiper controller being configured to automatically control the operation of the wiper on the basis of the automatic control, when the vehicle recognizer determines that the transition is made from the first state to the second state.

2. The vehicle recognition device according to claim 1, wherein the wiper controller is configured to cause the wiper to automatically operate when, in the second state, the second vehicle is unrecognizable from the one or more of the captured images obtained from the all or the part of the cameras.

3. The vehicle recognition device according to claim 2, wherein the wiper controller is configured to cause the wiper to automatically operate after a predetermined period of time has elapsed from the transition from the first state to the second state.

4. The vehicle recognition device according to claim 1, wherein the wiper controller is configured to cause the wiper to automatically operate after a predetermined period of time has elapsed from the transition from the first state to the second state.

5. The vehicle recognition device according to claim 1, wherein the wiper controller is configured to prevent the wiper from automatically operating when, in the second state, the second vehicle is unrecognizable from the captured images obtained from the all of the cameras.

6. The vehicle recognition device according to claim 2, wherein the wiper controller is configured to prevent the wiper from automatically operating when, in the second state, the second vehicle is unrecognizable from the captured images obtained from the all of the cameras.

7. The vehicle recognition device according to claim 1, wherein the wiper controller is configured to prevent the wiper from automatically operating when, in the second state, the second vehicle is unrecognizable from the captured images obtained from the all of the cameras.

8. The vehicle recognition device according to claim 1, further comprising a notifier configured to notify a driver of the first vehicle of information that the transition is made from the first state to the second state, when the vehicle recognizer has determined that the transition is made from the first state to the second state.

9. The vehicle recognition device according to claim 2, further comprising a notifier configured to notify a driver of the first vehicle of information that the transition is made from the first state to the second state, when the vehicle recognizer has determined that the transition is made from the first state to the second state.

10. The vehicle recognition device according to claim 1, further comprising a notifier configured to notify a driver of the first vehicle of information that the transition is made from the first state to the second state, when the vehicle recognizer has determined that the transition is made from the first state to the second state.

11. The vehicle recognition device according to claim 1, wherein
the cameras comprise a stereo camera that includes a right camera and a left camera, and
the part of the cameras comprises the right camera or the left camera.

12. The vehicle recognition device according to claim 2, wherein
the cameras comprise a stereo camera that includes a right camera and a left camera, and
the part of the cameras comprises the right camera or the left camera.

13. The vehicle recognition device according to claim 1, wherein
the cameras comprise a stereo camera that includes a right camera and a left camera, and
the part of the cameras comprises the right camera or the left camera.

14. A vehicle control apparatus comprising:
a vehicle recognizer configured to recognize, from captured images that are obtained from respective cameras provided in a first vehicle, a second vehicle that is different from the first vehicle;
a traveling controller configured to control traveling of the first vehicle, on a basis of a result of the recognition on the second vehicle performed by the vehicle recognizer; and
a wiper controller configured to control an operation of a wiper of the first vehicle on a basis of an operation signal or an automatic control, the wiper being provided in an imaging direction of the cameras, the operation signal being obtained on a basis of a manual operation performed on the first vehicle, wherein:
the wiper controller is configured to automatically increase frequency of the operation of the wiper when an intervehicle distance between the first vehicle and the second vehicle becomes less than a threshold after the wiper controller has caused the wiper to automatically operate, wherein the intervehicle distance is determined based on remaining one or more of the captured images obtained from remaining one or more of cameras excluding a part of the one or more cameras,
the vehicle recognizer being configured to determine, upon a first state, whether a transition is made from the first state to a second state, the first state being a state in which the second vehicle is recognizable from the captured images obtained from the respective cameras, the second state being a state in which the second vehicle is unrecognizable from one or more of the captured images, the one or more of the captured images being obtained from all or the part of the cameras, and
the wiper controller being configured to automatically control the operation of the wiper on the basis of the automatic control, when the vehicle recognizer determines that the transition is made from the first state to the second state.

15. The vehicle control apparatus according to claim 14, wherein the traveling controller is configured to execute, on the basis of the result of the recognition on the second vehicle, a control of increasing an intervehicle distance between the first vehicle and the second vehicle, a control of decreasing a speed of the first vehicle, or both.

16. A vehicle recognition device comprising:
circuitry configured to:
recognize, from captured images that are obtained from respective cameras provided in a first vehicle, a second vehicle that is different from the first vehicle,
control an operation of a wiper of the first vehicle on a basis of an operation signal or an automatic control, the wiper being provided in an imaging direction of the cameras, the operation signal being obtained on a basis of a manual operation performed on the first vehicle, wherein
a frequency of the operation of the wiper is automatically increased when an intervehicle distance between the first vehicle and the second vehicle becomes less than a threshold after the wiper automatically operated, wherein the intervehicle distance is determined based on remaining one or more of the captured images obtained from remaining one or more of cameras excluding a part of the one or more cameras,
determine, upon a first state, whether a transition is made from the first state to a second state, the first state being a state in which the second vehicle is recognizable from the captured images obtained from the respective cameras, the second state being a state in which the second vehicle is unrecognizable from one or more of the captured images, the one or more of the captured images being obtained from all or the part of the cameras, and
automatically control the operation of the wiper on the basis of the automatic control, when the determination is made that the transition is made from the first state to the second state.

17. A vehicle control apparatus comprising:
circuitry configured to:
recognize, from captured images that are obtained from respective cameras provided in a first vehicle, a second vehicle that is different from the first vehicle,
control traveling of the first vehicle, on a basis of a result of the recognition on the second vehicle,
control an operation of a wiper of the first vehicle on a basis of an operation signal or an automatic control, the wiper being provided in an imaging direction of the cameras, the operation signal being obtained on a basis of a manual operation performed on the first vehicle, wherein
a frequency of the operation of the wiper is automatically increased when an intervehicle distance between the first vehicle and the second vehicle becomes less than a threshold after the wiper automatically operated, wherein the intervehicle distance is determined based on remaining one or more of the captured images obtained from remaining one or more of cameras excluding a part of the one or more cameras,
determine, upon a first state, whether a transition is made from the first state to a second state, the first state being a state in which the second vehicle is recognizable from the captured images obtained from the respective cameras, the second state being a state in which the second vehicle is unrecognizable from one or more of the captured images, the one or more of the captured images being obtained from all or the part of the cameras, and automatically control the operation of the wiper on the basis of the automatic control, when the determination is made that the transition is made from the first state to the second state.

\* \* \* \* \*